United States Patent Office 3,423,309
Patented Jan. 21, 1969

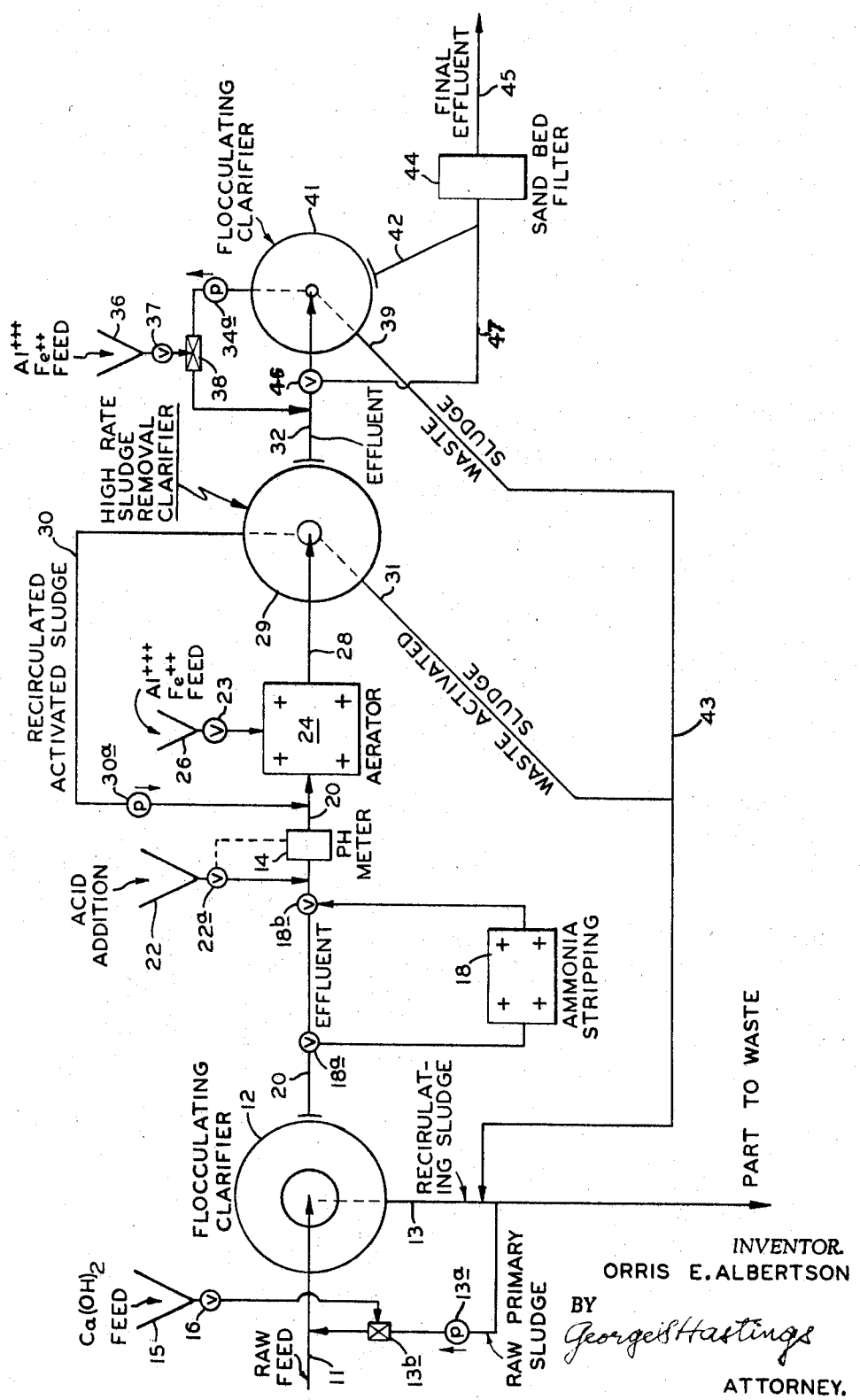

3,423,309
WASTE TREATMENT FOR PHOSPHATE REMOVAL
Orris E. Albertson, Norwalk, Conn., assignor to Dorr-Oliver Incorporated, Stamford, Conn., a corporation of Delaware
Continuation-in-part of application Ser. No. 570,017, Aug. 3, 1966. This application Mar. 22, 1968, Ser. No. 715,376
U.S. Cl. 210—5          20 Claims
Int. Cl. C02c 1/06

ABSTRACT OF THE DISCLOSURE

A process and apparatus for decreasing phosphorous content of organic wastes such as sewage to a high degree on the order of 5% or less of that originally present, to prevent algae growth, by a combination of lime dosage, biological removal and metal salt dosing together with recirculating of precipitated chemical containing sludges, in which each is so related to the other as to involve the lowest cost in chemicals. Also included is air stripping of ammonia and pH control of chemical feeding.

---

This application is a continuation-in-part of my copending application, Ser. No. 570,017, filed Aug. 3, 1966, now U.S. Patent No. 3,386,911. As pointed out in this application, a fundamental problem in stream and lake pollution is the increase in algae growth due to the fact that ordinary domestic sewage is a rich source of the nutrients required by algae, of which phosphorous and nitrogen are the most important. Phosphorous removal offers a practical and effective way of controlling algae growth in most natural waters.

Heretofore, extraction of phosphorous from sewage was done primarily in a chemical tertiary treatment of the effluent from the sewage plant before it is returned to natural waters, by massive doses of chemical precipitants for phosphates such as calcium oxide, alum or iron salts. Applicant's above identified co-pending application approaches this problem of massive dosage and consequent excessive cost through a complementary chemical and biological process and apparatus which reduces both the soluble phosphate compounds and the suspended organic phosphates in a limited primary lime treatment step followed by a biological removal of phosphorous, based on the discovery that the chemical and more specifically lime is relatively economical when used for gross removal of a major portion of the phosphorous but becomes progressively less economical because of using more chemical as the concentration of phosphorous becomes less. On the other hand, the rate of biological phosphorous removal is approximately proportional to the rate of cell synthesis and is not a function of the phosphorous concentration so long as conditions exist favorable to cell growth.

Thus by combining these two methods of phosphorous removal, economical removal of phosphorous can be obtained of 80% to 90% of the phosphorous. However, there is a limit to the phosphorous removal resulting from cell growth. There is leakage back into the liquid as well as metabolic removal of phosphate. As long as there is a high rate of cell activity and of phosphate removal the balance favors phosphate removal. But as the available B.O.D. gets less, say below 10% to 20% of that originally present, the cell activity slows. The ratio of phosphate removal to B.O.D. removal is believed to decrease and the proportion of phosphorous leaking back relative to that removed is believed to increase. Use of more lime adds to expensive and produces a high pH inhibitory to cell activity unless acid or $CO_2$ is added further increasing expense. There is a growing requirement for more refined removal of phosphorous on the order of 5% or less of the original amount of phosphorous present. Hitherto this result has been obtained by the massive doses of metal salts or of lime above referred to. This is too expensive to be practical for large quantities of sewage in many instances.

Applicant's invention solves this problem by a balanced and inter-related system utilizing an initial limited chemical precipitant treatment for that removal of phosphorous in which a chemical such as lime is most economical, biological treatment for metabolic removal where that is most effective, and metal salt precipitation for the relatively small remainder where the use of expensive metal salts is minimized by the relatively small amount of phosphorous to be removed. These steps of the process or elements of the system are combined with flocculation and clarification or other precipitant removal by means such as filtration or centrifuging. A very important element of this method and system is the recirculating of the flocculated and precipitated solids back into the flocculation and clarification or sedimentation area in order to increase utilization of chemicals and in the case of biological growth to accelerate this growth. This system also lends itself to the air stripping of ammonia to decrease nitrogen content of the effluent.

Important to this system is controlling pH. The moderate initial use of lime required in this process makes it possible to hold down pH to a figure not interfering with biological growth, without or with only minor addition of acid.

A further feature of the invention is applicant's discovery that for all except the most refined removal of phosphorous good results up to about a 95% removal can be obtained by feeding metal salts into the aerator, thus combining in one unit biological removal, chemical precipitation of the phosphates and recirculation of solids by separating the solids in the effluent from the aerator and recirculating them from a high rate sludge removal clarifier, by employment of which a high degree of contact between forming flocs and active sludge can be attained, resulting in maximum utilization of the chemicals in the sludge and maximum removal by biological growth of phosphorous. For many natural waters the effluent from this solids removal operation is sufficiently free from phosphorous to be sent to such waters without further chemical treatment.

When a higher degree of treatment is required than that referred to above, the feed of chemical to the aerator is eliminated and a final treatment utilized consisting of feeding metal salts to the effluent from the aerated sewage clarifier, followed by flocculation and clarification. Here also, a major part of the sludge is recirculated for greater chemical utilization. The final effluent may be as low in phosphorous as 1% to 5% of the phosphorous present in the original raw sawage.

Referring now to the drawing, the figure shows a diagrammatic plan view of the entire phosphorous removal method and apparatus.

As shown in the figure, a raw sewage feed 11 feeds the sewage to a combined flocculator and clarifier such, for example, as disclosed in the patent to Darby No. 2,268,475 issued Dec. 30, 1941. From this flocculating clarifier 12 a recirculating sludge conduit 13 delivers sludge through a mixer 13b back to the sludge feed 11. A chemical feeder 15 through valve 16 delivers a limited quantity of lime, enough to bring the pH of the sewage up to between 9 and 10.0, and to precipitate 70 to 85% of the phosphorus, believed to be mostly in the form of calcium phosphate, though other compounds of phosphorus may be present in the flocculator portion of the flocculator clarifier 12. There the precipitants are formed into larger flocs which settle to the bottom of the clarifier as sludge together with a major portion of the biological oxygen demand material (B.O.D.), which also has to be removed to provide an acceptable effluent. Thus there is little added cost for phosphorus removal, over that which would be required for the desired B.O.D. removal alone.

About nine-tenths of the settled sludge in clarifier 12 is recirculated by pump 13a to the feed of the clarifier, thus recontacting the raw sewage with the lime material in the precipitate increasing its utilization and also, it is believed, causing some absorption of phosphorous in the precipitate. This recirculation also results in taking out some additional B.O.D. further lessening the combined phosphorus and B.O.D. removal costs and reducing phosphorus content by 70 to 80% and B.O.D. by approximately 60 to 70%.

The effluent from clarifier 12 normally passes to an aerator 24 for biological treatment. At this point the system becomes an activated sludge system, i.e. oxygen in the form of air is bubbled through the effluent to promote growth of microorganisms which synthesize the organic material and nutrients including phosphorus into new cell growth. It is these cells which metabolically "consume" a portion of the remaining phosphorus, withdrawing it from the solution to generate and sustain sludge forming cell growth.

It is noted that due to the limited use of lime the pH of the effluent from clarifier 12 is low enough so as not to inhibit cell growth, with little or no cost for acid addition or $CO_2$ treatment.

In some instances it is desired to eliminate nitrogen as well as phosphates from the effluent. In this case the feed of lime through valve 16 is increased to raise the pH of the effluent from clarifier 12 to 10 to 11, high enough to dissociate the ammonia ions from their chemical compounds. The effluent from clarifier 12 is then by-passed through two-way valve 18a to ammonia stripping tank 18 in which air is bubbled through the effluent. The effluent, stripped of ammonia, is then returned through two-way valve 18b to conduit 17 for passage to the aerator. Since the pH from the ammonia stripping, while reduced by the stripping operation, may still be too high for sustained cell growth an acid feeder 22 to conduit 20 is provided at a location between valve 18b and the aerator. Acid feed is normally closed by an electrically controlled valve 22a when ammonia stripping is not employed.

An automatic control of pH is provided for the effluent going to the aerator, by means of a pH meter 14 of well known type which continuously senses the pH of the effluent in conduit 17, on the downstream side of the acid feeder, and sends a valve controlling signal to the electrically controlled valve 22a acting to control the acid feed to maintain a uniform predetermined pH in the effluent going to the aerator.

The aerated liquid from the aerator passes to a second clarifier 29 through conduit 28. A major portion of the biologically produced sludge from this clarifier, preferably approximately 90%, is fed back to the aeration tank through recirculation line 30 for the purpose of highly loading the aeration tank with biologically active sludge. This flocculator and clarifier is of the high rate three product type such as disclosed in the patent to Savage No. 3,349,030, issued Oct. 24, 1967, wherein the highly active sludge or floc spaced above the tank floor is rapidly picked up by uptake pipes on rake arms at different distances from the center of the tank. The combination of this rapid sludge removal clarifier 29 with the aerator tank and recirculation through conduit 30 constitutes an effective activated sludge system having a relatively short sludge retention time in the aerator of between one and three days in order to prevent leaking back into the sewage of the phosphorus taken up by the bacteria cells as the cells grow older. Moreover, this rapid recirculation not only promotes a high rate of cell growth but produces maximum contact of chemicals and precipitate with liquid and thus highly efficient use of the chemicals. The less active sludge resting on the bottom of the tank is in part wasted through conduit 31.

About half of the phosphorus and B.O.D. remaining in the sewage after the lime treatment and solids removal is removed by the biological growth in the activated sludge system, resulting in the overall elimination of something on the order of 80 to 90% of the phosphates and B.O.D. at an economical cost, not much more than the cost of removing B.O.D. alone. Additional treatment is needed in order to reduce phosphates to a 95% or greater removal level required by waters in some areas. This can be done by using metal salts alone, without preliminary liming or biological treatment, by means of a tertiary treatment of the final effluent as has been the practice in the past. However, this is generally prohibitively expensive because of the large quantities of expensive metal salts larger quantities of lime are required.

Removal by metal salts is basically a stoichiometric method, requiring an excess of about 1½ times stoichiometric in the aerator or about two times stoichiometric when used outside the aeration zone. When used as the sole means of removing phosphorous to concentrations equal to 5% of the original concentration this may result in cost figures as high as $40 to $70 per million gallons per day for removals of 8 to 10 mg. per liter. However, when there are low concentrations of phosphorus, the dosages are correspondingly lower and it is economical to use aluminum or iron salts as a final scavenger, either in the aeration basin or in a final flocculating clarifier operation.

For removals up to approximately 90% of the phosphates originally present, an effective method is to feed aluminum salts such as alum or iron salts such as ferrous sulfate into the aerator by chemical feeder 26 through valve 23 to the aerator. The effluent through conduit 32 from the rapid sludge removal clarifier may then be sufficiently free from phosphorus for discharge into most natural waters. This results in a relatively simple plant of low capital cost for securing, for many waters, adequate removal of algae forming phosphorous.

When, however, a higher degree of phosphate removal, to 95% or more of the phosphates in the raw sludge, is required, alum or ferrous sulfate or other bi-valent or tri-valent metal salt is fed through chemical feeder 36 through valve 37 and mixer 38 into the recirculation line 34, thence through conduit 32 into a flocculating clarifier 41 from which the effluent may be the final effluent at 95% or more of phosphate removal.

For the highest degree of removal, to eliminate whatever phosphorous and B.O.D. remains in the very fine suspended solids, effluent 42 may be passed through a sand filter, or a combined flocculator-clarifier and filter, such as disclosed in the patent to Magrath, No. 2,878,935, dated Mar. 24, 1959, may be employed. In order to decrease capital cost of the effluent 32 after treatment with metal salts may be fed directly to the solids separator or filter 44, instead of to the clarifier by valve 46 and conduit 47 thus making possible the elimination of the flocculating clarifier and tertiary recirculating means, while still producing an effluent of sufficient quality for many waters.

In order to prevent waste sludge from accumulating in the system a certain proportion of the sludge is sent to waste through conduits 13, 31 and 39 from clarifiers 12, 29 and 41 respectively via final waste exit conduit 43.

It is noted that the sludge from each of the three clarifiers 12, 29 and 41 shown in FIG. 1 is recirculated to the feed to these combined clarifiers and flocculators. This is of great importance particularly in the primary and secondary clarifiers 12 and 29 in making economical use of the chemicals since it brings the chemicals in the sludge into contact again with the suspended solids in the liquid sewage, thus substantially increasing the usage of these chemicals and probably resulting in some absorption of phosphorous in the solids thus increasing removal of phosphates and B.O.D. in precipitated sludge form.

Below are given examples of the present invention together with comparative costs of treatment to remove phosphorous, commencing with typical raw sewage influent having the following characteristics:

B.O.D. _____ 200 mg. per liter (mg./l).
Total suspended solids (TSS) 200 mg./l.
P _____ 8 mg./l. (24 mg./l. $PO_4$).
pH _____ 7.0±

EXAMPLE I

Lime treatment plus alum treatment in activated sludge aerator (a) The raw sewage influent is treated with 150 mg./l. of $Ca(OH)_2$ with recirculation of 9/10 of precipitated sludge resulting in a primary effluent as follows:

|  | | Percent of raw sewage |
|---|---|---|
| B.O.D., mg./l. | 80 | 40 |
| TSS, mg./l. | 40 | 20 |
| P, mg./l. (6 mg./l.–$PO_4$) | 2 | 25 |
| pH | 9.5 | |

(b) Primary effluent given activated sludge treatment by aeration and rapid active sludge recirculation and with 1.5 times stoichiometric amount of alum, viz: 18 mg./l fed into primary effluent for reaction in aerator resulting after flocculation and clarification in secondary effluent as follows:

|  | | Percent of raw sewage |
|---|---|---|
| B.O.D., mg./l. | 10 | 5.0 |
| TSS, mg./l. | 10 | 5.0 |
| P, mg./l.(.6 mg./l.–$PO_4$) | .2 | 2.5 |

EXAMPLE II

Lime treatment plus activated sludge plus separate alum treatment of activated sludge effluent (a) Same as (a) of Example I.

(b) Primary effluent after flocculation and clarification following activated sludge treatment of primary effluent for biological metabolic removal of phosphorous resulting in a secondary effluent as follows:

|  | | Percent of raw sewage |
|---|---|---|
| B.O.D., mg./l. | 15 | 7.5 |
| TSS, mg./l. | 20 | 10.0 |
| P, mg./l. ($PO_4$ 1.2–3.6) | .4–1.2 | 5–15 |

(c) Treatment of secondary effluent resulting from (b) with 2× stoichiometric amount of alum, viz 27 mg./l. followed by separation of resulting flocs by sedimentation, filtration or centrifuging:

|  | | Percent of raw sewage |
|---|---|---|
| B.O.D., mg./l. | <5 | 2.5 |
| TSS, mg./l. | <3 | 1.5 |
| P, mg./l.(.6 mg./l.–$PO_4$) | <.2 | 2.5 |

Comparative costs per million gals. per day (MGD), which are necessarily approximations because of the variations in sewage makeup and the form in which phosphates occur:

Example I: $ (MGD)
  150 mg./l. of $Ca_1OH_2$)=1250 lbs. @ $15/ton _____ 9.39
  18 mg./l. of alum=150 lbs. @ $50/ton ____ 3.75

Total _____ $13.14

Less credit for accompanying B.O.D. removal:
  Power for added B.O.D. removal 400 kw. @ 1.5¢ _____ 6.00
  Handling of excess activated sludge over less bulky more easily dewatered limed primary sludge @ 330 lbs. activated sludge per day @ $35 ton _____ 5.78

Total _____ $11.78
Net cost for P removal _____ $1.36

Example II:
  Same calculation as in Example I except 27 mg./l. of alum (225@ $50/ton) _____ $5.63
Net cost for P removal _____ 3.24

Conventional chemical removal—8 mg./l. P—
  Lime (tertiary, i.e. treatment of effluent from activated sludge clarifier): $ (MGD)
    Dosage—450 mg./l. $Ca(OH)_2$ _____ 28.00
    Neutralization—acid _____ 14.00

Total _____ $42.00
Alum:
  Dosage—102 mg./l. (applied during aeration step) _____ $21.00
  Dosage—210 mg./l. (tertiary) _____ 44.00

While I have described sedimentation type clarifiers for separating sludge from effluent by means of sedimentation in clarifiers it should be understood that after flocculation removal of solids and clarification of the liquids can be effected by other conventional solids removal means such as centrifuges or filters. These may be accompanied by recirculation of some of the resulting solids in the form of sludge to the flocculator for increased chemical utilization.

Thus applicant has disclosed an economical method and apparatus for securing percentages of phosphorous removal hitherto thought unattainable except at higher or even prohibitive cost of chemicals.

What is claimed is:

1. A combined chemical and biological process for treating liquid organic waste material containing phosphorous, to decrease the phosphorous content to a predetermined minimum concentration, comprising the steps of dosing the raw waste material with a limited amount of a chemical precipitant for phosphorous substantially less than the amount required to remove phosphorous to the predetermined concentration to form an insoluble precipitate of phosphorous; subjecting the dosed waste material to a first separation step to separate the material into sludge and an effluent; aerating the effluent from said separation to produce phosphorous consuming cell growth, dosing the effluent during aeration with a metal salt phosphorous precipitant to remove phosphorous by the combined action of said growth and said salt, in which the amount of salt required is reduced as a result of cell growth, subjecting the aerated and dosed effluent to a solids separation operation to remove the phosphorous bearing solids and produce a final effluent having a predetermined minimum concentration of phosphorous.

2. The invention as defined in claim 1 in which said first mentioned chemical precipitant is lime and said metal of said salt is bi-valent or tri-valent.

3. The invention defined in claim 1 in which the first solids separation step is a sedimentation operation, including the step of recirculating at least a part of the sludge from the first separation step back into the sedimentation operation to increase flocculation and utilization of the chemical.

4. The invention as defined in claim 1 in which said solids separation operation consists of flocculation and sedimentation.

5. The invention defined in claim 4 in which at least a part of the solids from said solids removal operation are recirculated to the first effluent to increase flocculation and utilization of chemicals.

6. A combined chemical and biological process for treating liquid organic waste material containing phosphorous, to decrease the phosphorous content to a predetermined minimum concentration, comprising the steps of dosing the raw waste material with a limited amount of a chemical precipitant for phosphorous substantially less than the amount required to remove phosphorous to the predetermined concentration to form an insoluble precipitate of phosphorous; subjecting the dosed waste material to a first solids removal step to separate the material into sludge and an effluent; aerating the effluent to produce phosphorous consuming cell growth; subjecting the aerated effluent to a second solids separation to remove the phosphorous-bearing biological sludge and produce a second effluent of a second predetermined second phosphorous concentration, dosing said second effluent with a metal salt phosphorous precipitant to precipitate the major portion of the phosphorous remaining and subjecting the dosed effluent to a solids removing operation to produce a final effluent of a predetermined minimum phosphorous content.

7. The invention defined in claim 6 in which said first mentioned precipitant is lime and in which said metal salt is a bi-valent or tri-valent metal salt.

8. The invention defined in claim 6 in which at least part of the solids from said solids removal operation are recirculated to said second effluent to increase flocculation and utilization of chemicals.

9. A process for decreasing the nutrient content of organic waste material to a predetermined level comprising the steps of:

(a) dosing the raw waste material in a first zone with a chemical which precipitates phosphorous and raises the pH to a level sufficient to dissociate ammonium ions from their chemical compounds;

(b) subjecting the dosed waste material to a first solids separation to remove at least a portion of the phosphorous content;

(c) transferring the effluent of the first separation to a second zone and discharging the ammonium ions dissociated by the increased pH as ammonia gas;

(d) aerating the effluent from the first zone in a third zone to produce phosphorous consuming cell growth; and, (e) subjecting the aerated effluent to a second solids separation to remove the phosphorous bearing biological sludge and produce a second effluent of further decreased phosphorous content;

(f) dosing the second effluent with a metal salt capable of chemical dissociation;

(g) subjecting the dosed second effluent to solids separation to yield a final effluent having a phosphorous content below a predetermined minimum.

10. The invention defined in claim 9 in which the raw waste material is dosed to a pH of between 10 and 11.

11. The invention defined in claim 10 in which acid is added from an acid source to the effluent from said second zone sufficient to reduce the pH to a level which permits active biological growth and effective use of said salts.

12. The invention defined in claim 11, in which said growth permitting pH is between 6 and 9.5.

13. The invention defined in claim 11 in which at least part of said acid source is $CO_2$ resulting from the biological growth.

14. A system for the removal of phosphorous from liquid organic waste material by both chemical and metabolic biological means comprising in combination, means for treating said waste material with a phosphorous precipitating chemical to precipitate part of the phosphorous, a first clarifier for clarifying said treated waste material into effluent and phosphate bearing sludge, means for recirculating a substantial portion of said phosphate bearing sludge back to said first clarifier, an aerator arranged to act on the effluent from the first clarifier to render it biologically active and thus phosphate consuming to remove a further part of the phosphorous, a chemical feed device for dosing said effluent during aeration to precipitate a sludge containing a final part of said phosphorous to reduce the phosphorous to the desired predetermined minimum phosphorous content, and a clarifier acting on the aerated effluent to produce a clarified final effluent and phosphate containing sludge.

15. The invention defined in claim 14 in which there is provided means for recirculating part of said last mentioned sludge to said effluent being aerated, and means for wasting part of said sludge and thereby removing phosphorous from the final effluent and the system.

16. A system for the removal of phosphorous and B.O.D. from liquid organic waste material by both chemical and metabolic biological means comprising in combination, means for treating said waste material with a phosphorous precipitating chemical to precipitate a first part of the phosphorous, a first clarifier for clarifying said treated waste mateiral into effluent and phosphate bearing sludge, means for recirculating a substantial portion of said phosphate bearing sludge back to said first clarifier, an aerator arranged to act on the effluent from the first clarifier to render it biologically active and thus phosphate consuming to remove a second part of the phosphorous from said effluent, solids separating means acting on the aerated effluent to produce clarified second effluent and phosphate containing sludge, a feed device arranged to dose the second effluent with a chemical precipitant, to precipitate a third part of the phosphorous, and a solids separator for separating the precipitate from said second effluent to yield a third effluent having the desired minimum content of phosphorous.

17. The invention defined in claim 16 in which recirculating means are provided for recirculating at least a part of the sludge from the second effluent back to the aerator to promote biological growth and increase utilization of the chemicals.

18. The invention as defined in claim 16 in which said treating means includes a feed for a chemical which varies the pH of the waste material, a valve associated with said feed controlling the rate at which the chemical is fed; and in which a pH meter is arranged to sense changes in pH of the effluent from said first clarifier, and means are connected to said meter and said valve for automatically controlling said valve in response to changes in the pH of said effluent to maintain a predetermined pH therein.

19. The invention defined in claim 16 in which said first clarifier includes a flocculator to which the waste material is delivered and mixing means cooperating with said recirculating means and said treating means to mix the precipitating chemical with the recirculated sludge and the waste material prior to delivery of the waste material to said flocculator.

20. The invention defined in claim 16 in which said solids separator for the dosed second effluent comprises a filter, and in which means are provided for conducting the dosed second effluent directly to said filter.

References Cited

UNITED STATES PATENTS

| | | | |
|---|---|---|---|
| 3,236,766 | 2/1966 | Levin | 210—6 |
| 3,386,910 | 6/1968 | Forrest | 210—5 |

OTHER REFERENCES

J. C. Buzzell, Jr. et al.: Removal of Algae Nutrients From Raw Sewage With Lime, Jour. WPCF, vol. 39, October 1967, pp. R–16 to R–24.

MICHAEL E. ROGERS, *Primary Examiner.*

U.S. Cl. X.R.

210—11, 18, 53, 201